United States Patent
Shi et al.

(10) Patent No.: US 11,774,232 B2
(45) Date of Patent: Oct. 3, 2023

(54) NONDESTRUCTIVE PROFILING OF ARTICLES INCLUDING CERAMIC COATINGS ON CONDUCTIVE SUBSTRATES

(71) Applicant: Rolls-Royce Corporation, Indianapolis, IN (US)

(72) Inventors: Jun Shi, Indianapolis, IN (US); Eric Carreras, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 126 days.

(21) Appl. No.: 17/304,290

(22) Filed: Jun. 17, 2021

(65) Prior Publication Data

US 2022/0404133 A1 Dec. 22, 2022

(51) Int. Cl.
*G01B 7/06* (2006.01)
*G01N 27/90* (2021.01)

(52) U.S. Cl.
CPC ......... *G01B 7/105* (2013.01); *G01N 27/9006* (2013.01)

(58) Field of Classification Search
CPC .... G01N 27/904; G01N 27/9006; G01N 1/00; G01N 3/00; G01N 5/00; G01N 7/00; G01N 9/00; G01N 11/00; G01N 13/00; G01N 15/00; G01N 17/00; G01N 19/00; G01N 21/00; G01N 22/00; G01N 23/00; G01N 24/00; G01N 25/00; G01N 27/00; G01N 29/00; G01N 30/00; G01N 31/00; G01N 33/00; G01N 35/00; G01N 37/00; G01N 2201/00; G01N 2203/00; G01N 2223/00; G01N 2291/00; G01N 2333/00; G01N 2400/00; G01N 2405/00; G01N 2407/00; G01N 2410/00; G01N 2415/00; G01N 2430/00; G01N 2440/00; G01N 2446/00; G01N 2458/00; G01N 2469/00; G01N 2470/00; G01N 2474/00; G01N 2496/00; G01N 2500/00; G01N 2510/00; G01N 2520/00; G01N 2550/00; G01N 2560/00; G01N 2570/00; G01N 2600/00;
(Continued)

(56) References Cited

U.S. PATENT DOCUMENTS

2003/0038628 A1* 2/2003 Nath .................... G01N 27/904
                                                              324/229
2017/0356849 A1* 12/2017 Henderkott .......... G01N 21/643

OTHER PUBLICATIONS

FR 3025306 A1 (Year: 2016).*

(Continued)

*Primary Examiner* — Feba Pothen
*Assistant Examiner* — Brent J Andrews
(74) *Attorney, Agent, or Firm* — Shumaker & Sieffert, P.A.

(57) ABSTRACT

A method may include positioning an eddy current probe proximate to a coated portion of an article. The coated portion of the article includes a conductive substrate and a ceramic coating overlying the conductive substrate. The method includes generating, using the eddy current probe, a first primary magnetic field to induce eddy currents in the coated portion of the article and measuring, using the eddy current probe, a strength of a first secondary magnetic field created by the eddy currents in the coated portion of the article to obtain a first secondary magnetic field measurement. The method includes determining, by a computing device, one or more properties or one or more changes in properties of the article based on the first secondary magnetic field measurement.

20 Claims, 3 Drawing Sheets

(58) Field of Classification Search
CPC ........... G01N 2610/00; G01N 2650/00; G01N 2800/00; G01B 7/105
See application file for complete search history.

(56) References Cited

OTHER PUBLICATIONS

Bruchwald et al., "Applications of High Frequency Eddy Current Technology for Material Characterization of Thin Coatings", J. of Materials Science and Engineering A 6 (7-8), 2016, 7 pgs. (Applicant points out, in accordance with MPEP 609.04(a), that the year of publication, 2016, is sufficiently earlier than the effective U.S. filing date, so that the particular month of publication is not in issue.).
Ridley et al., "Tailoring thermal properties of multi-component rare earth monosilicates", Acta Materialia 195 (2020) 698-707, Jun. 2020, 10 pgs.
Sheiretov et al., "TBC Characterization Using Magnetic and Electric Field Sensors", Proceedings of GT2007 ASME Turbo Expo 2007: Power for Land, Sea and Air May 14-17, 2007, 7 pgs.
Data Sheet "Pocket Instrument for Simple and Fast Coating Thickness Measurement on Virtually all Metals", www.helmut-fischer.com, Feb. 2015, 4 pgs.
Data Sheet "Instrument series for measuring coating thickness and surface profile height", www.helmut-fischer.com, May 2018, 6 pgs.
Bruchwald et al., "Material Characterization of Thin Coatings Using High Frequency Eddy Current Technology," 19th World Conference on Non-Destructive Testing, 2016, 6 pgs. (Applicant points out, in accordance with MPEP 609.04(a), that the year of publication, 2016, is sufficiently earlier than the effective U.S. filing date, so that the particular month of publication is not in issue.)

\* cited by examiner

NONDESTRUCTIVE PROFILING OF ARTICLES INCLUDING CERAMIC COATINGS ON CONDUCTIVE SUBSTRATES

TECHNICAL FIELD

The disclosure relates to electromagnetic nondestructive evaluation (NDE) of articles.

BACKGROUND

Components used in high-temperature and/or oxidative environments may be formed from ceramic composites coated with one or more protective layers to protect the underlying composites. These ceramic composite and protective layers may degrade over time due to volumetric expansion, oxidation, abrasion, or other physical or chemical processes that occur during operation in the high-temperature and/or oxidative environments. As a result, the ceramic composite may require repair or replacement of the protective layers or retirement of the ceramic composite. Often, the degradation of the ceramic composite and protective layers may not be apparent based on a visual inspection of the component.

SUMMARY

Systems and techniques described herein may include nondestructive evaluation of articles that include one or more ceramic coatings on a conductive substrate, such as a silicon-based ceramic matrix composite (CMC) substrate, by inducing eddy currents in the article and determining properties or changes in properties of the ceramic coating or conductive substrate based on the induced eddy currents. Such non-destructive evaluation may enable "on-wing" inspection of the articles for quality control (e.g., thickness) or environmental damage (e.g., change in thickness or composition due to erosion, silica depletion, or CMAS attach) of the one or more ceramic coatings or conductive substrate.

In some examples, a method may include positioning an eddy current probe proximate to a coated portion of an article. The coated portion of the article includes a conductive substrate and a ceramic coating overlying the conductive substrate. The method includes generating, using the eddy current probe, a first primary magnetic field to induce eddy currents in the coated portion of the article and measuring, using the eddy current probe, a strength of a first secondary magnetic field created by the eddy currents in the coated portion of the article to obtain a first secondary magnetic field measurement. The method includes determining, by a computing device, one or more properties or one or more changes in properties of the ceramic coating and/or conductive substrate based on the first secondary magnetic field measurement.

In some examples, a system may include an eddy current probe and a computing device. The eddy current probe may be configured to generate a first primary magnetic field to induce eddy currents in a coated portion of an article and measure a strength of a first secondary magnetic field created by the eddy currents in the coated portion to obtain a first secondary magnetic field measurement. The coated portion of the article includes a conductive substrate and a ceramic coating overlying the conductive substrate. The computing device is configured to determine one or more properties or one or more changes in properties of the ceramic coating and/or conductive substrate based on the first secondary magnetic field measurement.

The details of one or more examples are set forth in the accompanying drawings and the description below. Other features, objects, and advantages of the disclosure will be apparent from the description and drawings, and from the claims.

DETAILED DESCRIPTION

Figure 1A:
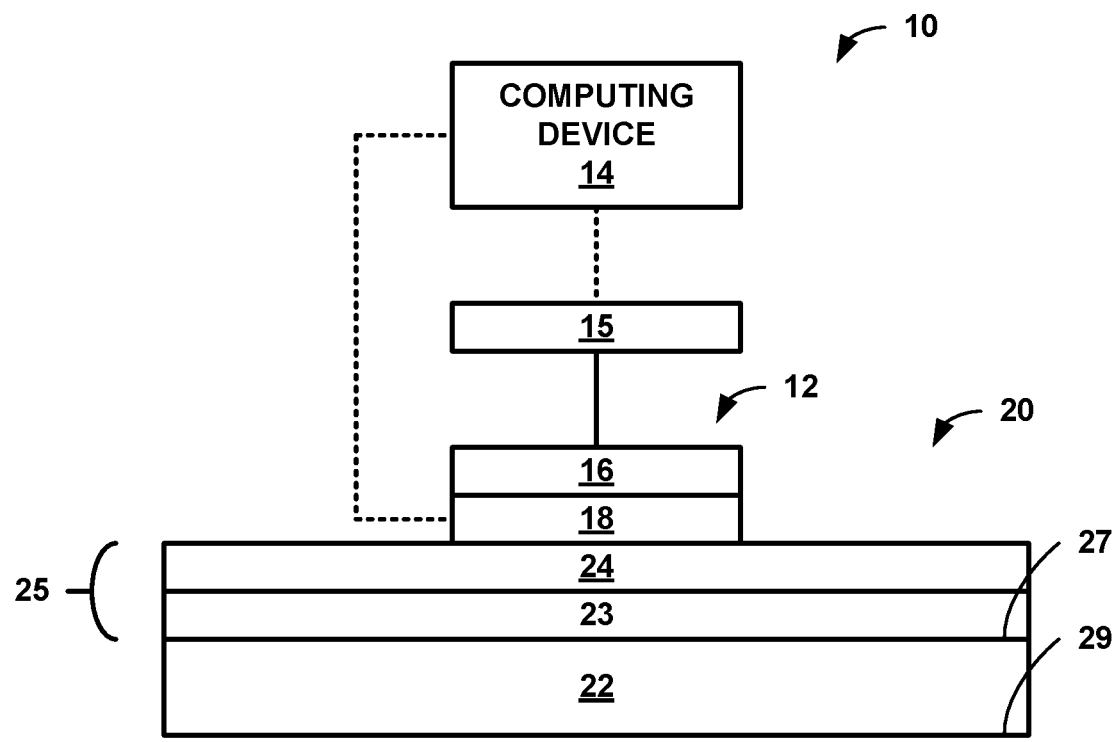
FIG. 1A is a diagram of an example system for nondestructively determining one or more properties of a ceramic coating on a CMC substrate using induced eddy currents.

The disclosure describes systems and techniques for determining properties of an article that includes a ceramic coating on a conductive substrate, such as a silicon-based CMC substrate, using induced eddy currents in the CMC substrate and, optionally, the ceramic coating. A high-temperature component formed from a silicon-based CMC substrate may be coated with a ceramic coating to protect the underlying substrate from high temperatures and oxidation, such as to protect silicon carbide from steam oxidation. To sufficiently protect the underlying substrate, the ceramic coating may be applied to a particular threshold thickness and at a particular coverage, such as on particular parts of the substrate or uniformly across the substrate. During operation of the component, a state of the ceramic coating may degrade, such as may be evidenced by increasing porosity, decreasing thickness, and/or changing composition.

Non-destructive evaluation (NDE) may be used to determine various properties of the ceramic coating and/or conductive substrate prior to or after the component has been put into operation, such as a thickness or coverage of the ceramic coating prior to operation and/or a state of the ceramic coating or conductive substrate during operation. Electromagnetic NDE of a material may by particularly useful for in-field testing of a component, as electromagnetic NDE systems may be relatively small and inexpensive. Electromagnetic NDE may involve detection of one or more electromagnetic properties of the material using electromagnetic radiation. However, direct electromagnetic NDE of ceramic coatings or substrates may be difficult or impossible due to a relatively low electrical conductivity, magnetic permeability, and/or thickness of the ceramic coatings or substrates.

Techniques described herein include determining one or more properties or changes in properties of a ceramic coating overlying a conductive substrate and/or properties of the conductive substrate by inducing eddy currents and measuring effects of the eddy currents in at least the conductive substrate underlying the ceramic coating. A component, such as a turbine blade, may include a silicon-based CMC substrate that is at least partially coated with a ceramic coating, such as a ceramic environmental barrier coating (EBC) on a bond coat overlying the CMC substrate. An eddy current probe may be positioned on or near a coated portion of the CMC substrate. The eddy current probe may generate a primary magnetic field that induces eddy currents in the CMC substrate and, optionally, in the ceramic coating. Eddy currents generated in the silicon-based CMC substrate may be relatively strong due to a relatively low electrical resistivity of the silicon-based CMC substrate, and may generate a corresponding secondary magnetic field that is measured by the eddy current probe. A computing device may receive and use one or more secondary magnetic field measurements, alone or in combination with other known or measured properties of the ceramic coating and/or CMC substrate, to determine one or more properties or changes in properties of the ceramic coating or CMC substrate.

As one example, the techniques described herein may be used to verify a thickness of the ceramic coating to control for quality of the corresponding article. For an article that includes a new ceramic coating on a silicon-based CMC substrate, a strength of the secondary magnetic field generated by eddy currents in the CMC substrate may correspond to a distance of the eddy current probe from the CMC substrate, and thereby a thickness of the ceramic coating overlying the CMC substrate. The computing device may use a measurement of the strength of the secondary magnetic field to determine the thickness of the ceramic coating at a particular time.

As another example, the techniques described herein may be used to quickly and/or accurately detect a change in state of the ceramic coating or underlying conductive substrate. A ceramic coating may undergo various state changes during operation, such as an increase in porosity or a change in composition. For an article that includes a potentially degraded ceramic coating on a CMC substrate, a change in a strength of the secondary magnetic field may correspond to a change in a distance of the eddy current probe from the CMC substrate, such as may be caused by volumetric expansion or contraction associated with a compositional change of the ceramic coating. The computing device may use a difference in measurements of the strength of the secondary magnetic field to determine a change in thickness of the ceramic coating, and a present operational state of the ceramic coating that corresponds to the change in thickness.

In one example, a change in state of a ceramic coating may include a change in state of a silicon bond coat. For example, upon exposure to oxidants such as oxygen or water vapor, silicon may oxidize into silica. While silicon may be a semiconductor, silica may be an insulator, such as that silica may have a substantially lower conductivity than silicon. A reduction in a thickness of the silicon bond coat and increase in a thickness of the silica layer (e.g., thermally grown oxide) may change a measured property, such as an apparent thickness or other measurement based on eddy currents generated in the article. As will be explained further below, such change in the measured property may be calibrated with a state of the bond coat, such that the state of the bond coat may be determined from the measurement of the measured property.

In another example, a change in a state of a ceramic coating may include a change in a state of a rare earth silicate environmental barrier coating (EBC). For example, upon exposure to oxidants, a rare earth disilicate, which may include a set of electromagnetic properties, may oxidize into a rare earth monosilicate, which may include a different set of electromagnetic properties. Such a change from the rare earth disilicate to the rare earth monosilicate may change the measurement based on eddy current generated in the ceramic coating. As another example, the rare earth disilicate may react with CMAS and to form a new chemical compound, apatite, which may include a different set of electromagnetic properties. Such a change from the rare earth disilicate to the apatite may change the measurement based on eddy current generated in the ceramic coating.

FIG. 1A is a diagram of a system 10 for determining one or more properties or changes in properties of a ceramic coating on a silicon-based ceramic matrix composite (CMC) substrate using induced eddy currents. In some instances, system 10 may be a portable system configured for in-field testing. For example, system 10 may be configured for use with relatively large and/or complex components, such as part of maintenance or periodic inspection.

An article 20 may include a conductive substrate 22. Conductive substrate 22 may include any substrate that is electrically conductive including, but not limited to, a metallic substrate, a ceramic substrate, a ceramic matrix composite (CMC) substrate, and the like. In some examples, conductive substrate 22 may include a silicon-based CMC substrate. Silicon-based ceramic materials, such as those including silicon carbide (SiC) as a matrix material and/or as a reinforcing material, may be used as substrate materials for components in high temperature applications, and may have a balance of reduced weight and high strength and durability compared to other high temperature materials. As such, article 20 may be used in a variety of high-temperature aerospace applications including, but not limited to, gas turbine engines, heat exchangers, internal combustion engines, and the like.

In examples in which conductive substrate 22 includes a CMC substrate, conductive substrate 22 may include a matrix material and a reinforcement material, at least one of which may include a relatively low electrical resistivity ceramic material. For example, the relatively low electrical resistivity ceramic material may have an electrical resistivity that is less than about 10 $\Omega \cdot cm$, such as less than about 1 $\Omega \cdot cm$ or less than about 0.1 $\Omega \cdot cm$. For example, a silicon carbide/silicon carbide CMC substrate may have an electrical resistivity less than about 0.1 $\Omega \cdot cm$, such as 0.025 $\Omega \cdot cm$, while a silicon bond coat may have an electrical resistivity less than about 1 $\Omega \cdot cm$, such as 0.5 $\Omega \cdot cm$. Such relatively low electrical resistivity may be configured by increasing a crystalline phase of the ceramic material, including one or more dopants in the ceramic material, manufacturing the ceramic material using chemical vapor deposition or other incremental deposition process, and/or incorporating unreacted silicon into a melt-infiltrated silicon carbide matrix, as unreacted silicon may have a lower electrical resistivity than a silicon carbide matrix that is deposited through chemical vapor deposition.

The matrix material may include, but is not limited to, silicon metal, carbon (C), silicon carbide (SiC), silicon nitride ($Si_3N_4$), alumina ($Al_2O_3$), an aluminosilicate, silica ($SiO_2$), a transition metal carbide or silicide (e.g. WC, $Mo_2C$, TiC, $MoSi_2$, $NbSi_2$, $TiSi_2$), combinations thereof, or the like. The reinforcement material may include, but is not limited to, carbon (C), silicon carbide (SiC), silicon nitride ($Si_3N_4$), alumina ($Al_2O_3$), an aluminosilicate, silica ($SiO_2$), a transition metal carbide or silicide (e.g., WC, $Mo_2C$, TiC, $MoSi_2$, $NbSi_2$, $TiSi_2$), combinations thereof, or the like. The reinforcement material may include various ceramic structures including, but not limited to, continuous fibers and/or discontinuous fibers, whiskers, platelets, or particulates. Conductive substrate 22 may be manufactured using one or more techniques including, for example, chemical vapor deposition (CVD), chemical vapor infiltration (CVI), polymer impregnation and pyrolysis (PIP), slurry infiltration, melt infiltration, combinations thereof, or other techniques.

Article 20 includes one or more coated portions that include one or more ceramic coatings 25 overlying conductive substrate 22. In the example of FIG. 1A, article 20 includes a bond coat 23 on a top surface 27 of conductive substrate 22 and a single ceramic overcoat 24 on a top surface of bond coat 23; however, article 20 may include any number of ceramic coatings. In some examples, ceramic overcoat 24 may include at least one of a thermal barrier coating (TBC), an environmental barrier coating (EBC), or an abradable coating.

In examples in which ceramic coating 25 includes a TBC, the TBC may include a thermally insulative material. Common TBCs may include ceramic layers including zirconia or hafnia, and optionally one or more other elements or compounds to modify a desired characteristic of the TBC, such as, for example, phase stability, thermal conductivity, or the like. Exemplary additive elements or compounds include rare earth oxides (oxides of Lu, Yb, Tm, Er, Ho, Dy, Tb, Gd, Eu, Sm, Pm, Nd, Pr, Ce, La, Y, or Sc). Particular examples of materials from which a TBC may be formed include zirconia stabilized with between 7 weight percent (wt. %) and 8 wt. % yttria; zirconia stabilized with ytterbia, samaria, and at least one of lutetia, scandia, ceria, gadolinia, neodymia, or europia; or hafnia stabilized with ytterbia, samaria, and at least one of lutetia, scandia, ceria, gadolinia, neodymia, or europia. In some examples, ceramic overcoat 24 may include zirconia and/or hafnia in combination with additive elements or compounds such that at least some of the stabilized zirconia or hafnia forms a metastable tetragonal-prime crystalline phase, a cubic crystalline phase, or a compound phase ($RE_2Zr_2O_7$ or $RE_2Hf_2O_7$, where RE is a rare earth element).

In examples in which ceramic coating 25 includes an EBC, the EBC may include a material which reduces or substantially prevents attack of conductive substrate 22 by chemical species present in the environment in which article 20 is utilized, e.g., in the intake gas or exhaust gas of a gas turbine engine. For example, the EBC may include a material that is resistant to oxidation or water vapor attack. Examples of EBC materials include mullite; glass ceramics such as barium strontium aluminosilicate ($BaO$—$SrO$—$Al_2O_3$-$2SiO_2$; BSAS), calcium aluminosilicate ($CaAl_2Si_2O_8$; CAS), cordierite (magnesium aluminosilicate), and lithium aluminosilicate; and rare earth silicates (silicates of Lu, Yb, Tm, Er, Ho, Dy, Tb, Gd, Eu, Sm, Pm, Nd, Pr, Ce, La, Y, or Sc). The rare earth silicate may be a rare earth monosilicate ($RE_2SiO_5$, where RE stands for "rare earth") or a rare earth di-silicate ($RE_2Si_2O_7$, where RE stands for "rare earth").

In examples in which ceramic overcoat 24 includes an abradable coating, the abradable coating may include a material selected to protect conductive substrate 22 and/or underlying layers of ceramic overcoat 24 from physical damage, such as impact against other components. An abradable coating may be configured to be abraded, e.g., by a blade of a gas turbine engine, in order to form a relatively tight seal between article 20 and another component, such as, for example, a blade of a gas turbine engine. Abradability may include a disposition to break into relatively small pieces when exposed to a sufficient physical force. Abradability may be influenced by the material characteristics of the material(s) in the abradable coating, such as fracture toughness and fracture mechanism (e.g., brittle fracture), as well as the porosity of the abradable coating. In examples in which an additional coating includes an abradable costing, the additional coating may exhibit thermal shock resistance and high-temperature capability. The abradable coating may include any suitable material. For example, the abradable coating may include at least one of a rare-earth oxide, a rare-earth silicate, an aluminosilicate, or an alkaline earth aluminosilicate. In some examples, as described above, the additional coating including an abradable coating includes at least one rare-earth disilicate, mullite, B SAS, BAS, SAS, at least one rare earth oxide, at least one rare earth monosilicate, or combinations thereof. Additionally, or alternatively, the additional coating including an abradable coating may include any of the compositions described herein with respect to an EBC.

In some examples, ceramic coating 25 may include a bond coat 23 between ceramic overcoat 24 and conductive substrate 22. Bond coat 23 may increase adhesion of one or more overlying layers of ceramic overcoat 24 to substrate 22. In some examples, bond coat 23 may include silicon, a metal silicide, a rare earth (RE) monosilicate, an RE disilicate, hafnium silicate, mullite, SiC, a metal oxide or a mixture thereof. In examples in which conductive substrate 22 is a silicon-based CMC substrate, bond coat 23 may include a ceramic or another material that is compatible with the silicon-based material from which conductive substrate 22 is formed. For example, bond coat 23 may include mullite (aluminum silicate, $Al_6Si_2O_{13}$), silicon metal or alloy, silica, a silicide, or the like. Bond coat 23 may further include other elements, such as a rare earth silicate including a silicate of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), and/or scandium (Sc). In some examples, bond coat 23 may act as a protective layer that decreases migration of an oxidizing agent into substrate 22. Bond coat 23 may form a protective thermally grown oxide (TGO) layer with the oxidizing agent.

Article 20 may also include one or more uncoated portions that do not include one or more ceramic coatings 24 overlying conductive substrate 22. For example, article 20 may include one or more surfaces that are not intended to be exposed to a high-temperature or oxidative environment. In the example of FIG. 1A, a bottom surface 29 of conductive substrate 22 may not be coated; in other examples, a different portion of conductive substrate 22 may be uncoated, such as a portion of top surface 27 adjacent to ceramic coating 25.

Components of article 20, such as conductive substrate 22, bond coat 23, and/or ceramic overcoat 24, may have different electromagnetic properties, such as electrical conductivity/resistivity and magnetic permeability, that result in different responses to a time-varying alternating magnetic field. For example, conductive substrate 22 may have a relatively low electrical resistivity and a relatively high magnetic susceptibility, ceramic overcoat 24 may have a relatively high electrical resistivity and a relatively low magnetic susceptibility, and bond coat 23 may have a relatively moderate electrical resistivity and a relatively moderate magnetic susceptibility. During exposure to a high temperature and/or oxidative atmosphere, various physical or chemical properties of ceramic overcoat 24, bond coat 23, and/or conductive substrate 22 may change. For example, a porosity of ceramic overcoat 24 may increase, a phase or composition of ceramic overcoat 24 or conductive substrate 22 may change, a thickness of ceramic overcoat 24 may increase or decrease, and/or a thickness of bond coat 23 may increase or decrease. As a result of these physical or chemical changes, one or more electromagnetic properties of ceramic overcoat 24, bond coat 23, and/or conductive substrate 22 may correspondingly change.

System 10 may be configured to determine properties or changes in properties of ceramic overcoat 24, bond coat 23, and/or conductive substrate 22 by generating and measuring eddy currents in article 20, including conductive substrate 22. System 10 may include an eddy current probe 12 electrically coupled to a current source 15. Eddy current probe 12 may be configured to receive an electrical current from current source 15, generate a primary magnetic field from the electrical current to induce eddy currents in one or more electrically conductive portions of article 20, and measure a secondary magnetic field created by the eddy currents in the one or more conductive portions of article 20. In the example of FIG. 1A, eddy current probe 12 includes an excitation coil 16 and a measurement coil 18.

Figure 1B:
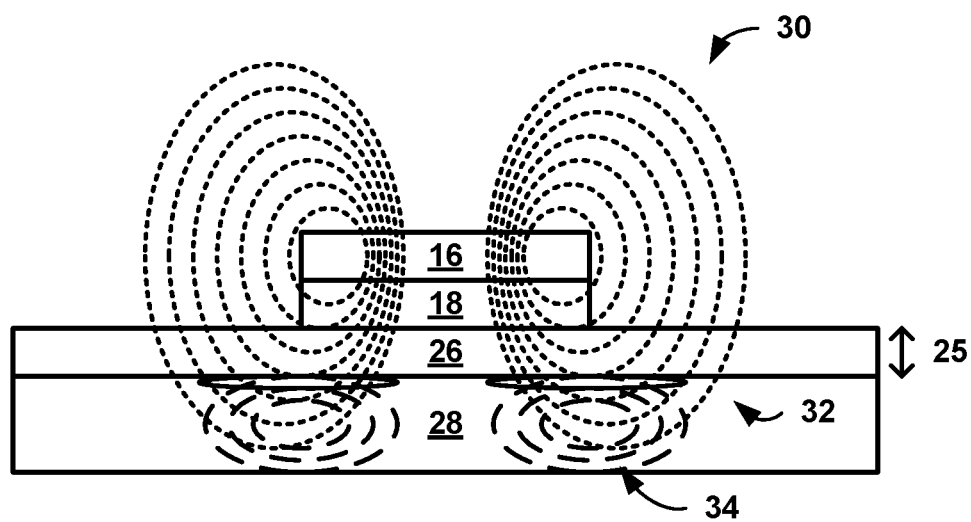
FIG. 1B is a diagram of an example eddy current probe inducing eddy currents in the article of FIG. 1A.

FIG. 1B is a diagram of an eddy current probe inducing eddy currents in a conductive portion 26 of article 20 of FIG. 1A. As mentioned above, article 20 may include one or more conductive portions 26 having a relatively low electrical resistivity. In the example of FIG. 1B, conductive portion 26 of article 20 may include conductive substrate 22 of FIG. 1A. Article 20 may also include one or more overlying portions 28. In the example of FIG. 1B, overlying portion 28 may include ceramic coating 25 of FIG. 1A, including ceramic overcoat 24 and bond coat 23. In some instances, ceramic overcoat 24 and/or bond coat 23 may be substantially electrically non-conductive, while in other examples, ceramic overcoat 24 and/or bond coat 23 may be electrically conductive and/or less electrically conductive than conductive substrate 22. For purposes of illustration, overlying portion 28 will primarily be described in FIG. 1B as being electrically non-conductive.

Excitation coil 16 may be configured to generate a primary magnetic field 30. For example, excitation coil 16 may receive an alternating, time-varying electrical current from current source 15 and generate an alternating primary magnetic field in response to the electrical current. Primary magnetic field 30 may induce eddy currents 32 in one or more conductive portions 26 of article 20. A strength of eddy currents 32 may correspond to an electrical conductivity of conductive portion 26 and a magnetic permeability of conductive portion 26. For example, one or more conductive phases in conductive portion 26, such as a conductive reinforcement material or matrix material of conductive substrate 22, may produce relatively strong eddy currents 32 in response to varying primary magnetic field 30. However, due to a relatively high electrical resistivity, overlying portion 28 may not produce eddy currents 32, or may produce relatively weak eddy currents. A depth of eddy currents 32 may correspond to the electrical conductivity of conductive portion 26, the magnetic permeability of conductive portion 26, and a frequency of the electrical current. For example, an increased electrical conductivity of conductive portion 26, an increased magnetic permeability of conductive portion 26, and/or an increased frequency of the electrical current may correspond to an increased strength of eddy currents 32 and/or a decreased penetration depth of eddy currents 32. As a result of these induced eddy currents 32, conductive portion 26 may generate a secondary magnetic field 34.

In the example of FIG. 1B, eddy currents 32 are only shown as induced in conductive portion 26; however, eddy currents may be induced in overlying portion 28, including ceramic overcoat 24. For example, while ceramic overcoat 24 and/or bond coat 23 may have a relatively low electrical conductivity and/or magnetic permeability compared to conductive substrate 22, ceramic overcoat 24 and/or bond coat 23 may still generate eddy currents in response to primary electric field 30, and thus contribute to at least a portion of secondary magnetic field 34. As will be explained further below, such partial contributions to secondary magnetic field 34 may be included in calibrations that correlate one or more properties of ceramic overcoat 24, bond coat 23, and/or conductive substrate 22 to a measurement of secondary magnetic field 34, such that ceramic overcoat 24, bond coat 23, and/or conductive substrate 22 may be directly characterized by eddy currents generated in respective ceramic overcoat 24, bond coat 23, and/or conductive substrate 22.

Measuring coil 18 may be configured to measure secondary magnetic field 34. For example, secondary magnetic field 34 may produce an electrical impedance in measuring coil 18 and, as a result, create a characteristic measurement signal. This measurement signal may be influenced by a distance of measuring coil 18 from eddy currents 32. For example, as a distance 25 between eddy currents 34 in conductive portion 26 and measuring coil 18 increases, the strength of the measurement signal induced by secondary magnetic field 34 may decrease. In the example of FIG. 1B, distance 25 may correspond to a thickness of overlying portion 28.

Referring back to FIG. 1A, system 10 may include a computing device 14. Computing device 14 may include any of a wide range of devices, including processors (e.g., one or more microprocessors, one or more application specific integrated circuits (ASICs), one or more field programmable gate arrays (FPGAs), or the like), one or more servers, one or more desktop computers, one or more notebook (i.e., laptop) computers, one or more cloud computing clusters, or the like. Computing device 14 may be communicatively coupled to current source 15 and eddy current probe 12.

Computing device 14 may be configured to control one or more parameters of the time-varying primary magnetic field generated by eddy current probe 12. Computing device 14 may be configured to send control signals to current source 15 that cause current source 15 to produce an alternating electrical current having particular properties, such as frequency, amplitude, and phase. The control signals may, through the alternating electrical current produced by current source 15, control various parameters of the primary magnetic field such as strength of the primary magnetic field, penetration depth of the primary magnetic field, and the like. In some examples, computing device 14 may be configured to generate control signals that control a frequency of the alternating electrical current output by current source 15. Particular frequencies of the alternating electrical current may generate eddy currents at particular depths within article 20, such that increasing a frequency of the alternating electrical current may decrease a depth of the eddy currents in article 20. For example, computing device 14 may be configured to send control signals to current source 15 to produce an alternating current with a frequency that corresponds to a particular penetration depth of the eddy currents induced by the primary magnetic field. Such depth control may enable computing device 14 to cause eddy current probe 12 to produce eddy currents in particular portions of one or more layers, such as conductive substrate 22, bond coat 23, and/or ceramic overcoat 24.

Computing device 14 may be configured to receive measurement signals from eddy current probe 12, such as measuring coil 18. As described above, the measurement signals received from eddy current probe 12 may represent a strength of a secondary magnetic field produced by the induced eddy currents in conductive substrate 22, ceramic overcoat 24, and/or bond coat 23. In some examples, computing device 14 may include one or more filters or other post-processing devices configured to further process the measurements signals from eddy current probe 12.

Computing device 14 may be configured to determine one or more properties of ceramic overcoat 24, bond coat 23, and/or conductive substrate 22 based on one or more measurements of a strength of the secondary magnetic field produced in a coated portion of article 20. In some examples, computing device 14 may be configured to determine one or more properties of ceramic overcoat 24 and/or bond coat 23 based on one or more measurements of the strength of a secondary magnetic field substantially produced by conductive substrate 22 (i.e., indirect characterization). For example, ceramic overcoat 24 and/or bond coat 23 may be substantially electrically non-conductive, such that ceramic overcoat 24 and/or bond coat 23 may not substantially contribute to the strength of the secondary magnetic field measured by eddy current probe 12. However, ceramic overcoat 24 and/or bond coat 23 may still affect the strength of the secondary magnetic field measured by eddy current probe 14, such as by physically separating conductive substrate 22 from eddy current probe 14.

In some examples, computing device 14 may be configured to determine a thickness of ceramic overcoat 24 and/or bond coat 23 based substantially on eddy currents produced in conductive substrate 22. As mentioned above in FIG. 1B, a strength of the secondary magnetic field may be related to a particular distance between conductive portion 26 and measuring coil 18, and this distance may correspond to a thickness of the corresponding overlying portion 28, such as ceramic overcoat 24 and/or bond coat 23. In examples in which bond coat 23 is directly overlying conductive substrate 22 (e.g., prior to application of ceramic overcoat 24), the distance may correspond to a thickness of bond coat 23. In examples in which ceramic overcoat 24 is directly on conductive substrate 22 (e.g., without bond coat 23), the distance may directly correspond to a thickness of ceramic overcoat 24. In examples in which ceramic overcoat 24 is not directly on conductive substrate 22, such as with bond coat 23 between ceramic overcoat 24 and conductive substrate 22 (e.g., as shown in FIG. 1A), the distance may correspond to a thickness of both ceramic overcoat 24 and bond coat 23, from which a known or measured thickness of bond coat 23 may be factored to determine a thickness of ceramic overcoat 24.

In some examples, computing device 14 may be configured to determine one or more properties that correspond to a change in thickness of ceramic overcoat 24 and/or bond coat 23 based substantially on eddy currents produced in conductive substrate 22. For example, a thickness of ceramic overcoat 24 and/or bond coat 23 may change due to presence or operation of article 20 in a high temperature and/or oxidative environment. The change in thickness may result from one or more changes in physical or chemical properties of ceramic overcoat 24 and/or bond coat 23 that tend to occur at particular conditions of the high temperature and/or oxidative environment, such as a state or condition of ceramic overcoat 24, a porosity or change in porosity of ceramic overcoat 24, a thickness of an oxide layer on bond coat 23, a composition or change in composition of ceramic overcoat 24, and any other properties that may correspond to a change in thickness of ceramic overcoat 24 and/or bond coat 23. As one example, a porosity of ceramic overcoat 24 may increase due to oxidation of ceramic overcoat 24, resulting in an increase in a thickness of ceramic overcoat 24. As another example, a thickness of a thermally grown oxide layer of bond coat 23 may increase due to oxidation of silicon in bond coat 23 to silicon dioxide, resulting in an increase in thickness of bond coat 23. As another example, a surface of ceramic overcoat 24 may wear down during operation, resulting in a decrease in thickness of ceramic overcoat 24.

In some examples, computing device 14 may be configured to determine one or more properties of ceramic overcoat 24, bond coat 23, and/or conductive substrate 22 based on one or more measurements of the strength of the secondary magnetic field produced at least partially by ceramic overcoat 24, bond coat 23, and/or conductive substrate 22 (i.e., direct characterization). For example, in addition to conductive substrate 22, ceramic overcoat 24 and/or bond coat 23 may also be electrically conductive, such that any or all of ceramic overcoat 24, bond coat 23, and/or conductive substrate 22 may produce eddy currents in response to the primary magnetic field and contribute to the strength of the secondary magnetic field. As a result, computing device 14 may be configured to determine changes in physical or chemical properties of ceramic overcoat 24, bond coat 23, and conductive substrate 22 that result in changes in electromagnetic properties of ceramic overcoat 24, bond coat 23, and/or conductive substrate 22.

In some examples, computing device 14 may be configured to determine a change in state or condition of ceramic overcoat 24, bond coat 23, and/or conductive substrate 22 based on eddy currents produced in ceramic overcoat 24, bond coat 23, and/or conductive substrate 22. For example, a composition, porosity, density, and/or microstructure of ceramic overcoat 24, bond coat 23, and/or conductive substrate 22 may change due to degradation of ceramic overcoat 24, bond coat 23, and/or conductive substrate 22 in a high temperature and/or oxidative environment. These changes in composition, porosity, density, and/or microstructure may represent or indicate a state or condition of ceramic overcoat 24, bond coat 23, and/or conductive substrate 22. For example, the state or condition of ceramic overcoat 24, bond coat 23, and/or conductive substrate 22 may be quantified by any properties related to a change in composition, porosity, density, and/or microstructure, an estimated remaining service life, a rating, or other indication of an extent of degradation of ceramic overcoat 24, bond coat 23, and/or conductive substrate 22. The changes in composition, porosity, and/or microstructure may result in a change in electromagnetic properties of ceramic overcoat 24, bond coat 23, and/or conductive substrate 22. As one example, a porosity of ceramic overcoat 24 may increase due to oxidation of ceramic overcoat 24 and subsequent formation of non-conductive or less conductive oxides, resulting in a decrease in electrical conductivity of ceramic overcoat 24. As another example, a composition of an EBC that includes rare earth silicates may increase in a first phase of a rare earth monosilicate having a first electrical conductivity and decrease in a second phase of a rare earth disilicate having a second, different electrical conductivity, resulting in a change in electrical conductivity of the EBC.

Computing device 14 may be configured to correlate a change in electromagnetic properties to a state or condition of ceramic overcoat 24, bond coat 23, and/or conductive substrate 22, and may be configured to determine one or more conditions for further operation of article 20, such as a remaining service life of ceramic overcoat 24, bond coat 23, and/or conductive substrate 22. For example, the electromagnetic properties of equivalent coatings for ceramic overcoat 24, bond coat 23, and/or conductive substrate 22 may be measured at various operating and/or environmental conditions and corresponding known state or condition, such that computing device 14 may be configured to correlate a change in electromagnetic properties at the operating and/or environmental conditions to the state or condition of ceramic overcoat 24 and/or bond coat 23.

Computing device 14 may be configured to receive and use additional information, in combination with the measurements of the secondary magnetic field, to determine one or more properties of ceramic overcoat 24, bond coat 23, and/or conductive substrate 22. In some examples, computing device 14 may be configured to receive and/or store known or predetermined physical, chemical, and/or electromagnetic values of properties of conductive substrate 22, ceramic overcoat 24, and/or bond coat 23. For example, computing device 14 may be configured to receive one or more electromagnetic properties of conductive substrate 22, such as an electrical conductivity or electrical resistivity value of conductive substrate 22 or a magnetic permeability value of conductive substrate 22; one or more physical properties of conductive substrate 22, bond coat 23, or ceramic overcoat 24, such as an anticipated thickness value of bond coat 23 or ceramic overcoat 24; and the like.

In some examples, computing device 14 may be configured to receive and/or store relational information that relates measurement signals from eddy current probe 12 to one or more properties of ceramic overcoat 24, bond coat 23, and/or conductive substrate 22. Relational information may include any calibration information that relates a strength or change in strength of the secondary magnetic field for a particular material (or a material having particular electromagnetic properties) with a physical or chemical property (or change in physical or chemical properties) of the material, such as a thickness of the material, a density, porosity, or composition of the material, a state/condition of the material, and the like.

In some instances, the relational information may relate a measurement of a strength of a secondary magnetic field produced by a particular conductive substrate 22 to a particular thickness of a non-conductive coating or layer. For example, the relational information may include calibration tables for a particular conductive portion 26, such as conductive substrate 22, that may apply to all or most non-conductive overlying portions 28, such as ceramic overcoat 24, bond coat 23, and/or conductive substrate 22.

In some instances, the relational information may relate a difference in measurements of a strength of a secondary magnetic field to a state or condition of ceramic overcoat 24, bond coat 23, and/or conductive substrate 22 for a particular set of operating conditions. For example, various articles having combinations of conductive substrate 22, ceramic overcoat 24, and/or bond coat 23 may be exposed to operating and/or environmental conditions that degrade ceramic overcoat 24, bond coat 23, and/or conductive substrate 22 and cause corresponding changes to one or more physical or chemical properties. During or after exposure, the articles may be periodically probed to measure electromagnetic properties and/or effects created by electromagnetic properties, such as a strength of a secondary electric field produced by induced eddy currents in the respective article, and evaluated for particular physical or chemical properties that result from degradation of ceramic overcoat 24, bond coat 23, and/or conductive substrate 22. In some examples, computing device 14 may be configured to receive one or more tables, such as for a particular combination of conductive substrate 22, ceramic overcoat 24, and/or bond coat 23, that correlate the measurement signal received from measuring coil 18 with a state or condition of ceramic overcoat 24, bond coat 23, and/or conductive substrate 22.

In some examples, rather than or in addition to receiving relational information, computing device 14 may be configured to capture and store relational information. For example, computing device 14 may be configured to receive a measurement signal of a strength of a secondary magnetic field for an uncoated portion of article 20 to contrast against a measurement signal of a strength of a secondary magnetic field for a coated portion of article 20. As another example, computing device 14 may be configured to receive one or more measurement signals of a strength of a secondary magnetic field for coatings or layers at different known thicknesses, such as coatings having similar electromagnetic properties as ceramic overcoat 24 (e.g., if ceramic overcoat 24 is conducting) or any non-conducting composition (e.g., if ceramic overcoat 24 is non-conducting).

Figure 2A:
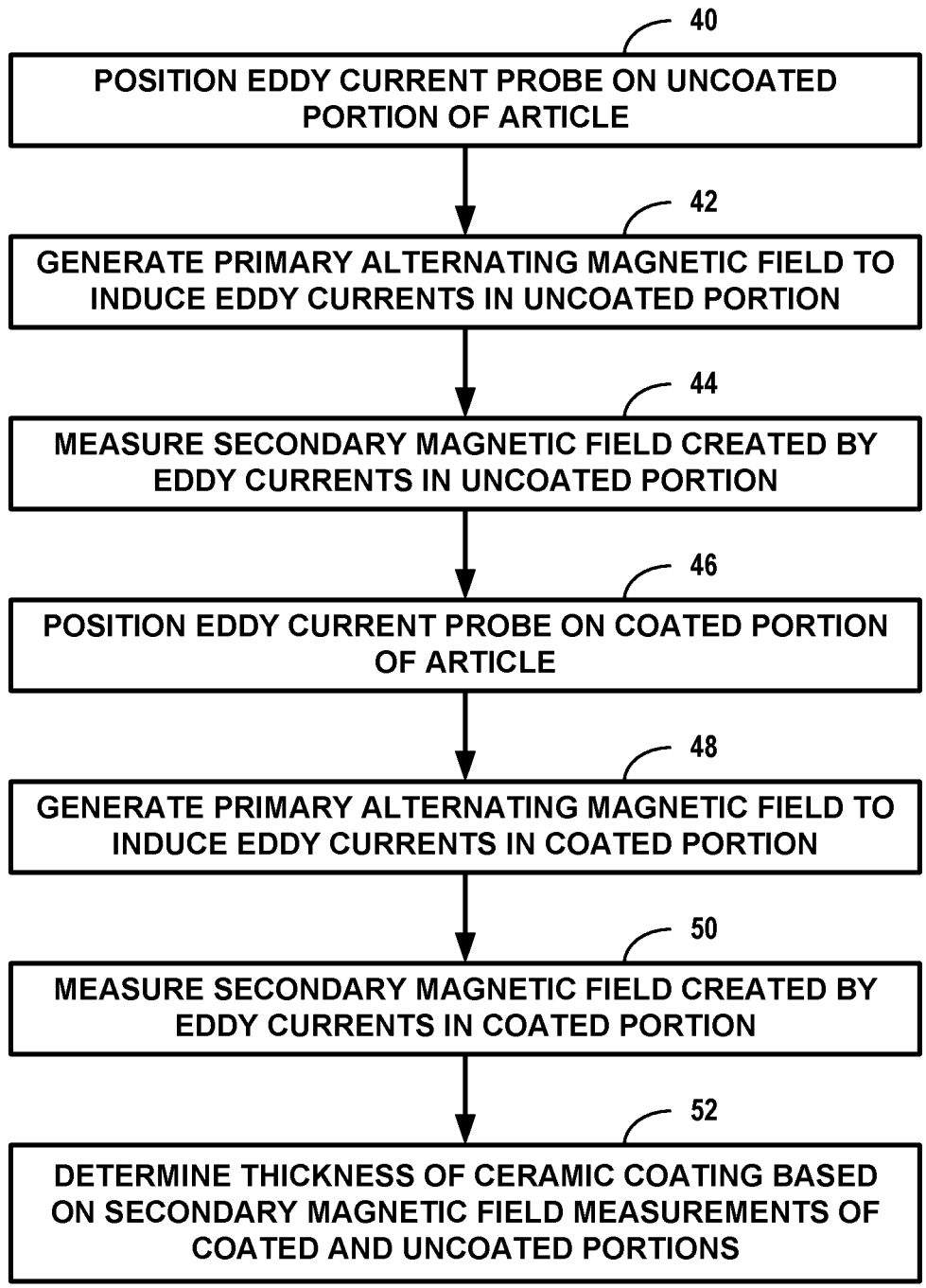
FIG. 2A is a flow diagram illustrating an example technique for nondestructively determining a thickness a ceramic coating and/or a bond coat on a CMC substrate using induced eddy currents in an uncoated and a coated portion of an article.

In some examples, computing device 14 may be configured to determine a thickness of ceramic overcoat 24 and/or bond coat 23. FIG. 2A is a flow diagram illustrating an example technique for nondestructively determining a thickness of a ceramic coating and/or bond coat on a CMC substrate using induced eddy currents in an uncoated and a coated portion of an article. The example technique of FIG. 2A will be described with respect to FIG. 1A; however, the example technique of FIG. 2A may be used with other systems and articles.

In some examples, such as shown in FIG. 2A, computing device 14 may determine a thickness of ceramic overcoat 24 and/or bond coat 23 based on a difference between a strength of a secondary magnetic field produced by conductive substrate 22 with and without a coating. In such examples, the example technique of FIG. 2A may include positioning eddy current probe 12 near an uncoated portion of article 20 (40). For example, eddy current probe 12 may be positioned directly on (i.e., in contact with) conductive substrate 22, such that there is substantially no distance between eddy current probe 12 and conductive substrate 22. The example technique of FIG. 2A may include generating, using eddy current probe 12, a primary magnetic field to induce eddy currents in the uncoated portion of article 20 (42). The example technique of FIG. 2A may include measuring, using eddy current probe 12, a secondary magnetic field created by the eddy currents in the uncoated portion of article 20 (44).

The example technique of FIG. 2A may include positioning eddy current probe near coated portion of article 20 (46). For example, eddy current probe 12 may be positioned directly on ceramic overcoat 24, such that a gap corresponding to a thickness of ceramic overcoat 24 and/or bond coat 23 may separate conductive substrate 22 from eddy current probe 12. The example technique of FIG. 2A may include generating, using eddy current probe 12, a primary magnetic field to induce eddy currents in the coated portion of article 20 (48). For example, eddy current probe 12 may receive an alternating electrical current from current source 15 having a particular frequency that generates a primary magnetic field having a penetrating depth sufficient to produce eddy currents in conductive substrate 22. The example technique of FIG. 2A may include measuring, using eddy current probe 12, a secondary magnetic field created by the eddy currents in the coated portion of article 20. For example, for ceramic overcoat 24 and/or bond coat 23 that is non-conductive or less conductive than conductive substrate 22, the strength of the secondary magnetic field for the uncoated portion of article 20 may be less than the strength of the secondary magnetic field for the coated portion of article 20.

The example technique of FIG. 2A may include determining, by computing device 14, a thickness of ceramic overcoat 24 and/or bond coat 23 in the coated portion of article 20 based on the measurements of the strength of the secondary magnetic field in the coated and uncoated portions (52). For example, computing device 14 may determine a difference between the measurements of the strength of the secondary magnetic field in the uncoated and coated portions. This difference in the measurements may correspond to a distance between eddy current probe 12 and conductive substrate 22. For example, computing device 14 may correlate the difference between the measurements with the thickness of ceramic overcoat 24 and/or bond coat 23.

In some examples, the example technique of FIG. 2A may include repeating steps 46-52 for additional portions of article 20. For example, the coated portion of article 20 may be a first coated portion of article 20. The example technique of FIG. 2A may include positioning eddy current probe near a second coated portion of article 20 (46), generating a primary magnetic field to induce eddy currents in the second coated portion of article 20 (48), measuring a secondary magnetic field created by the eddy currents in the second coated portion of article 20 (50), and determining, by computing device 14, a thickness of ceramic overcoat 24 and/or bond coat 23 in the second coated portion of article 20 based on the measurements of the strength of the secondary magnetic field in the second coated portion and the uncoated portion (52). In some examples, computing device 14 may use the thicknesses of the first and second coated portions to determine a spatial map or other representation of ceramic overcoat 24 and/or bond coat 23. In some examples, computing device 14 may further determine one or more additional properties of ceramic overcoat 24 and/or bond coat 23 based on a difference in thickness between the first and second coated portions. For example, computing device 14 may use the difference in thickness between the first and second coated portions, and/or between other thicknesses of coated portions, to determine a variation and/or uniformity of ceramic overcoat 24 and/or bond coat 23.

Figure 2B:
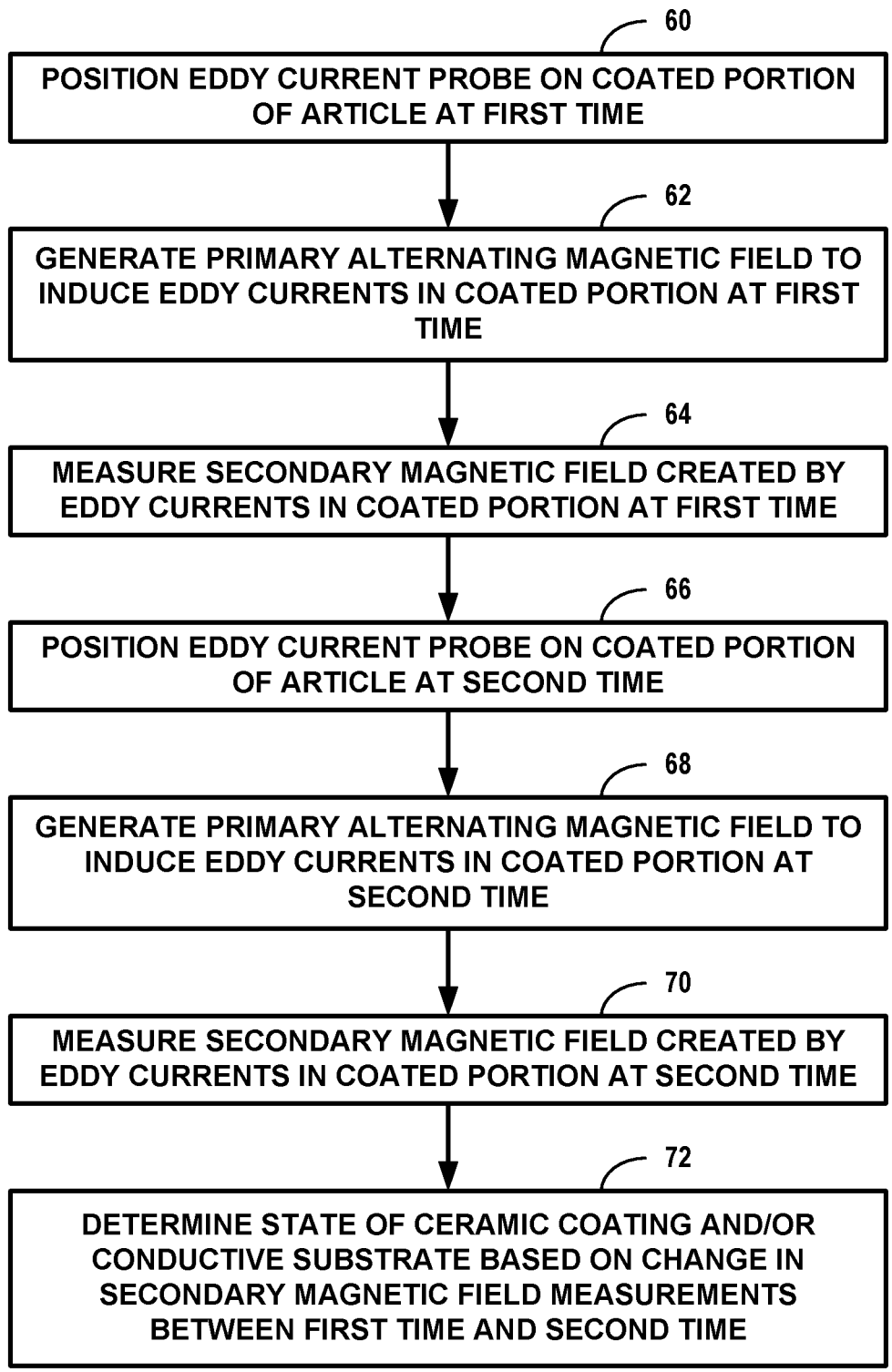
FIG. 2B is a flow diagram illustrating an example technique for nondestructively determining a state of a ceramic coating and/or a bond coat on a CMC substrate using induced eddy currents at a first time and a second time.

In some examples, computing device 14 may be configured to determine a state of ceramic overcoat 24, bond coat 23, and/or conductive substrate 22 based on secondary magnetic field measurements of a coated portion of article 20 at different times. FIG. 2B is a flow diagram illustrating an example technique for nondestructively determining a state of a ceramic coating and/or bond coat on a CMC substrate using induced eddy currents at a first time and a second time. The example technique of FIG. 2B will be described with respect to FIG. 1A; however, the example technique of FIG. 2B may be used with other systems and articles.

The example technique of FIG. 2B may include positioning eddy current probe near coated portion of article 20 at a first time (60). For example, the first time may include an initial testing or verification of article 20 prior to being placed in service, or may include a previous (e.g., last known) operating condition. The example technique of FIG. 2B may include generating, using eddy current probe 12, a primary magnetic field to induce eddy currents in the coated portion of article 20 at the first time (62) and measuring, using eddy current probe 12, a secondary magnetic field created by the eddy currents in the coated portion of article 20 at the first time (64), such as described in steps 46-50 of FIG. 2A. The strength of the secondary magnetic field measured at the first time may represent a reference operating condition of ceramic overcoat 24, bond coat 23, and/or conductive substrate 22, such as at a beginning of life of article 20. As will be described further below, subsequent measurements of the strength of the secondary magnetic field for article 20 may be compared against the reference operating condition to determine a current state or condition of ceramic overcoat 24, bond coat 23, and/or conductive substrate 22.

The example technique of FIG. 2B may include positioning eddy current probe near coated portion of article 20 at a second time (66). For example, the second time may be a testing or maintenance interval. The example technique of FIG. 2B may include generating, using eddy current probe 12, a primary magnetic field to induce eddy currents in article 20 at the second time (68) and measuring, using eddy current probe 12, a secondary magnetic field created by the eddy currents in article 20 at the second time (70), such as described in steps 46-50 of FIG. 2A. The strength of the secondary magnetic field measured at the second time may represent a present state or condition of ceramic overcoat 24 and/or bond coat 23, such as at the testing or maintenance interval. As will be described further below, subsequent measurements of the strength of the secondary magnetic field for article 20 may be compared against the reference state or condition to determine a current state or condition of ceramic overcoat 24 and/or bond coat 23.

The example technique of FIG. 2B may include determining, by computing device 14, a state and/or condition of ceramic overcoat 24, bond coat 23, and/or conductive substrate 22 based on the measurements of the strength of the secondary magnetic field at the first and second times (72). For example, computing device 14 may determine a difference between the measurements of the strength of the secondary magnetic field at the first and second times. This difference in the measurements may correspond to one or more changes in physical or chemical properties caused during operation of article 20 in a high temperature and/or oxidative environment. Computing device 14 may correlate the difference between the measurements with the present state or condition of ceramic overcoat 24, bond coat 23, and/or conductive substrate 22. As one example, the difference between the measurements may represent a change in physical and/or chemical properties between a present state or condition and an initial state or condition, such that computing device 14 may correlate the difference with an absolute state or condition. As another example, the difference between the measurements may represent a change in physical and/or chemical properties between a present state or condition and a last known state or condition, such that computing device may correlate the difference with a relative state or condition.

EXPERIMENTAL SECTION

Trial 1—Coating Thickness on CMC Discs

Free-standing environmental barrier coatings (EBC) having predetermined thicknesses of 0.03 inches and 0.05 inches were formed from silicon carbide. An eddy current probe (Dual Scope probe; Fischer Scientific) was calibrated using the two measurements. Three ceramic matrix composite (CMC) discs were formed from silicon carbide. Each CMC disc was spray coated on a top side with the EBC described above to a nominal thickness of 0.055 inches. For each sample, an uncoated bottom side of the respective CMC disc was measured using the eddy current probe to zero the eddy current probe. The coated top side of the respective CMC disc was measured using the eddy current probe to determine a thickness of each coating on the respective CMC disc, as shown in Table 1 below:

| Reading | Sample 1 Thickness (mil) | Sample 2 Thickness (mil) | Sample 3 Thickness (mil) |
|---|---|---|---|
| 1 | 54.2 | 52.4 | 56.1 |
| 2 | 54.0 | 53.0 | 54.3 |
| 3 | 52.0 | 54.1 | 55.0 |
| 4 | 53.1 | N/A | 55.2 |
| Average | 53.3 | 53.2 | 55.2 |

Trial 2—Coating Thickness on CMC Plate

A CMC plate was formed from silicon carbide. The CMC plate was spray coated on a top side with the EBC described above to a nominal thickness of 0.055 inches. An uncoated bottom side of the CMC plate was measured using the eddy current probe to zero the eddy current probe. The coated top side of the CMC plate was measured using the eddy current probe to determine a thickness of the coating on the CMC plate, as shown in Table 2 below:

| Reading | Sample Thickness (mil) |
|---|---|
| 1 | 51.5 |
| 2 | 50.7 |
| 3 | 49.8 |
| 4 | 51.6 |
| Average | 50.9 |

Trial 3—Coating Thickness on CMC Seal Segment

A CMC seal segment was formed from silicon carbide. The CMC seal segment was spray coated on a top side with the EBC described above to a nominal thickness of 0.026 inches. An uncoated bottom side of the CMC seal segment was measured using the eddy current probe to zero the eddy current probe. The coated top side of the CMC seal segment was measured using the eddy current probe to determine a thickness of the coating on the CMC seal segment, as shown in Table 3 below:

| Reading | Sample Thickness (mil) |
|---|---|
| 1 | 27.6 |
| 2 | 27.4 |
| 3 | 24.9 |
| 4 | 25.5 |
| Average | 26.5 |

Trial 4—Coating Thickness on CMC Substrate after Steam Oxidation

Three ceramic matrix composite CMC discs were formed from silicon carbide. Each CMC disc was spray coated on a top side with the EBC described above to a nominal thickness of 0.06 inches. Each sample was exposed to steam for a period of 300 hours at a pressure of 14.7 pounds per square inch (psi) total pressure, a composition of 90% steam, and a temperature of 1316° C. For each sample, an uncoated bottom side of the respective CMC disc was measured using the eddy current probe to zero the eddy current probe. The coated top side of the respective CMC disc was measured using the eddy current probe to determine a thickness of each coating on the respective CMC disc, as shown in Table 4 below:

| Reading | Sample 1 Thickness (mil) | Sample 2 Thickness (mil) | Sample 3 Thickness (mil) |
|---|---|---|---|
| 1 | 32.9 | 31.6 | 29.4 |
| 2 | 31.8 | 30.4 | 29.9 |
| 3 | 30.4 | 31.1 | 30.0 |
| 4 | 31.7 | 31.2 | 29.5 |
| Average | 31.7 | 31.1 | 29.7 |

Various examples have been described. These and other examples are within the scope of the following claims.

What is claimed is:

1. A method comprising:
    positioning an eddy current probe proximate to a coated portion of an article, wherein the coated portion of the article comprises a conductive substrate and a ceramic coating overlying the conductive substrate;
    generating, using the eddy current probe, a first primary magnetic field to induce eddy currents in the coated portion of the article;
    measuring, using the eddy current probe, a strength of a first secondary magnetic field created by the eddy currents in the coated portion of the article to obtain a first secondary magnetic field measurement;
    positioning the eddy current probe proximate to an uncoated portion of the article;
    generating, using the eddy current probe, a second primary magnetic field to induce eddy currents in the uncoated portion of the article;
    measuring, using the eddy current probe, a strength of a second secondary magnetic field created by the eddy currents in the uncoated portion of the article to obtain a second secondary magnetic field measurement; and
    determining, by a computing device, one or more properties of the ceramic coating based on a difference between the first secondary magnetic field measurement and second secondary magnetic field measurement.

2. The method of claim 1, wherein the one or more properties are determined further based on an electrical conductivity and a magnetic permeability of the conductive substrate.

3. The method of claim 1, wherein the one or more properties include at least one of a thickness of a ceramic overcoat or a thickness of a bond coat of the ceramic coating.

4. The method of claim 1, wherein the first secondary magnetic field is measured for the coated portion at a first time, and wherein the method further comprises:
    generating, using the eddy current probe, a third primary magnetic field to induce eddy currents in the coated portion at a second time;
    measuring, using the eddy current probe, a strength of a third secondary magnetic field created by the eddy currents in the coated portion at the second time to obtain a third secondary magnetic field measurement; and
    determining, by the computing device, one or more changes in properties of the article based on a difference between the first secondary magnetic field measurement and the third secondary magnetic field measurement of the coated portion at the respective first and second times.

5. A method comprising:
    positioning an eddy current probe proximate to a coated portion of an article, wherein the coated portion of the article comprises a conductive substrate and a ceramic coating overlying the conductive substrate;

generating, using the eddy current probe, a first primary magnetic field to induce eddy currents in the coated portion at a first time;

measuring, using the eddy current probe, a strength of a first secondary magnetic field created by the eddy currents in the coated portion of the article to obtain a first secondary magnetic field measurement;

generating, using the eddy current probe, a second primary magnetic field to induce eddy currents in the coated portion at a second time;

measuring, using the eddy current probe, a strength of a second secondary magnetic field created by the eddy currents in the coated portion at the second time to obtain a second secondary magnetic field measurement; and determining, by the computing device, one or more changes in properties of the article based on a difference between the first and second secondary magnetic field measurements of the coated portion at the first and second times.

6. The method of claim 1, wherein the first secondary magnetic field is measured for a first coated portion, and wherein the method further comprises:

generating, using the eddy current probe, a third primary magnetic field to induce eddy currents in a second coated portion of the article;

measuring, using the eddy current probe, a strength of a third secondary magnetic field created by the eddy currents in the second coated portion of the article to obtain a third secondary magnetic field measurement; and determining, by the computing device, one or more properties or one or more changes in properties of the article based on a difference between the first secondary magnetic field measurement and the third secondary magnetic field measurement.

7. A system, comprising:

an eddy current probe configured to:
generate a first primary magnetic field to induce eddy currents in a coated portion of an article, wherein the coated portion of the article comprises a conductive substrate and a ceramic coating overlying the conductive substrate; and measure a strength of a first secondary magnetic field created by the eddy currents in the coated portion to obtain a first secondary magnetic field measurement;

generate a second primary magnetic field to induce eddy currents in at least one of:
an uncoated portion of the article;
the coated portion of the article at a second time, wherein the first secondary magnetic field is measured for the coated portion at a first time; or
a second coated portion, wherein the first secondary magnetic field is measured for a first coated portion; and measure a strength of a second secondary magnetic field created by the eddy currents induced in the at least one of the uncoated portion, the coated portion at the second time, or the second coated portion to obtain a second secondary magnetic field measurement; and a computing device configured to determine a respective:
one or more properties of the ceramic coating based on a difference between the first secondary magnetic field measurement and second secondary magnetic field measurement of the respective coated and uncoated portions of the article;

one or more changes in properties of the article based on a difference between the first secondary magnetic field measurement and second secondary magnetic field measurement of the coated portion at the respective first and second times; or one or more properties or one or more changes in properties of the article based on a difference between the first secondary magnetic field measurement and the second secondary magnetic field measurement of the respective first and second coated portions measurements.

8. The system of claim 7,
wherein the article comprises the uncoated portion,
wherein the eddy current probe is further configured to:
generate the second primary magnetic field to induce eddy currents in the uncoated portion of the article; and measure the strength of a second secondary magnetic field created by the eddy currents in the uncoated portion to obtain the second secondary magnetic field measurement, and wherein the computing device is configured to determine the one or more properties of the ceramic coating based on the difference between the first secondary magnetic field measurement and the second secondary magnetic field measurement of the respective coated and uncoated portions of the article.

9. The system of claim 7, wherein the one or more properties of the ceramic coating based on the second secondary magnetic field measurement for the uncoated portion includes a thickness of the ceramic coating.

10. The system of claim 7,
wherein the first secondary magnetic field is measured for the coated portion at the first time,
wherein the eddy current probe is further configured to:
generate the second primary magnetic field to induce eddy currents in the coated portion at the second time; and measure the second secondary magnetic field created by the eddy currents in the coated portion at the second time, and wherein the computing device is further configured to determine the one or more changes in properties of the article based on a difference between the first secondary magnetic field measurement and the second secondary magnetic field measurement of the coated portion at the respective first and second times.

11. The system of claim 7, wherein the one or more changes in properties of the article based on the second secondary magnetic field measurement for the coated portion at the second time includes a change in composition of at least one of a ceramic overcoat or bond coat of the ceramic coating.

12. The system of claim 7, wherein the conductive substrate comprises a silicon-based ceramic matrix composite (CMC) substrate.

13. The system of claim 12, wherein the one or more changes in properties of the article based on the second secondary magnetic field measurement for the second coated portion includes a change in composition of the CMC substrate.

14. The system of claim 12, wherein the ceramic coating comprises an environmental barrier coating (EBC) and a bond coat between the EBC and the CMC substrate, wherein the EBC comprises a rare earth silicate, and wherein the bond coat comprises silicon.

15. The method of claim 5, wherein the one or more changes in properties of the article includes a change in composition of the ceramic coating.

16. A method comprising:
- positioning an eddy current probe proximate to a first coated portion of an article, wherein the first coated portion of the article comprises a conductive substrate and a ceramic coating overlying the conductive substrate;
- generating, using the eddy current probe, a first primary magnetic field to induce eddy currents in the coated portion of the article;
- measuring, using the eddy current probe, a strength of a first secondary magnetic field created by the eddy currents in the coated portion of the article to obtain a first secondary magnetic field measurement;
- generating, using the eddy current probe, a second primary magnetic field to induce eddy currents in a second coated portion of the article;
- measuring, using the eddy current probe, a second secondary magnetic field created by the eddy currents in the second coated portion of the article to obtain a second secondary magnetic field measurement; and
- determining, by the computing device, one or more properties or one or more changes in properties of the article based on a difference between the first and second secondary magnetic field measurements.

17. The method of claim 16, wherein the conductive substrate comprises a silicon-based ceramic matrix composite (CMC) substrate.

18. The method of claim 17, wherein the one or more changes in properties of the article includes a change in composition of the CMC substrate.

19. The method of claim 17, wherein the ceramic coating comprises an environmental barrier coating (EBC) and a bond coat between the EBC and the CMC substrate.

20. The method of claim 17, wherein the EBC comprises a rare earth silicate, and wherein the bond coat comprises silicon.

* * * * *